US008294695B2

(12) United States Patent
Chen et al.

(10) Patent No.: US 8,294,695 B2
(45) Date of Patent: Oct. 23, 2012

(54) DISPLAY DRIVING APPARATUS AND METHOD THEREOF

(75) Inventors: Hsiang-Chih Chen, Taipei (TW); Jui-Lin Lo, Tainan County (TW); Don-Chen Hsin, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1246 days.

(21) Appl. No.: 12/056,231

(22) Filed: Mar. 26, 2008

(65) Prior Publication Data

US 2009/0021499 A1 Jan. 22, 2009

(30) Foreign Application Priority Data

Jul. 16, 2007 (TW) ............................... 96125832 A

(51) Int. Cl.
*G06F 3/038* (2006.01)

(52) U.S. Cl. ........................... 345/204; 345/87; 382/233

(58) Field of Classification Search .................. 345/555, 345/562, 567, 87–101, 204–215; 382/232–253; 708/203; 348/14.13, 439.1, 568; 709/247
See application file for complete search history.

(56) References Cited

U.S. PATENT DOCUMENTS

| | | | | |
|---|---|---|---|---|
| 4,929,946 | A * | 5/1990 | O'Brien et al. | 341/87 |
| 5,978,098 | A * | 11/1999 | Takeuchi et al. | 382/237 |
| 6,317,522 | B1 * | 11/2001 | Rackett | 382/268 |
| 7,403,183 | B2 * | 7/2008 | Someya | 345/98 |
| 2002/0057213 | A1 * | 5/2002 | Heath | 341/51 |
| 2003/0117407 | A1 * | 6/2003 | Minami | 345/555 |
| 2005/0225522 | A1 * | 10/2005 | Wu et al. | 345/87 |
| 2006/0152501 | A1 * | 7/2006 | Furihata et al. | 345/204 |
| 2006/0164365 | A1 * | 7/2006 | Huang et al. | 345/98 |
| 2007/0285371 | A1 * | 12/2007 | Nam et al. | 345/98 |

* cited by examiner

*Primary Examiner* — Liliana Cerullo
(74) *Attorney, Agent, or Firm* — Jianq Chyun IP Office

(57) ABSTRACT

A display driving apparatus and a method thereof are provided. The apparatus includes a memory unit, a compression and decompression unit, a data selection unit, and a display accelerating unit. The memory unit is coupled to the compression and decompression unit and stores only a compressed frame to save memory space in the apparatus. The data selection unit determines whether an error is caused to a frame through data compression and decompression. When the error is greater than a predetermined value, the display accelerating unit turns off an overdriving process upon the pixels to avoid image distortion. The data selection unit also determines whether the frames are static or dynamic in order to determine whether to turn on the overdriving process.

15 Claims, 6 Drawing Sheets

| | | | |
|---|---|---|---|
| 101 | 98 | 99 | 46 |
| 102 | 50 | 48 | 48 |

DISPLAY DRIVING APPARATUS AND METHOD THEREOF

CROSS-REFERENCE TO RELATED APPLICATION

This application claims the priority benefit of Taiwan application serial no. 96125832, filed on Jul. 16, 2007. The entirety the above-mentioned patent application is hereby incorporated by reference herein and made a part of specification.

BACKGROUND OF THE INVENTION

1. Field of the Invention

The present invention generally relates to a display driving apparatus, in particular, to a display driving apparatus with overdriving mechanism.

2. Description of Related Art

When a liquid crystal display (LCD) displays an image data, a driving voltage is supplied on each pixel to rotate the liquid crystal molecules in the pixel and accordingly change the transmissivity of the pixel, so that the pixel can display desired brightness and color. The rotation rate and angle of the liquid crystal molecules are related to the value of the driving voltage, namely, the higher the driving voltage is, the larger the rotation rate and the angle in stable state are.

To meet the display rate of the LCD and prevent residual image while displaying dynamic images, an overdrive value has to be supplied on the pixel so that the rotation of the liquid crystal molecules can be driven to another angle in a specific period of time while displaying the next image. In this way, the rotation speed can be raised. The overdrive value corresponding to a particular gray scale value can be located in a lookup table (LUT).

FIG. 1 is a block diagram of a conventional overdriving apparatus. Referring to FIG. 1, the memory unit 110 stores the pixel data of a previous frame F1. The display accelerating unit 120 receives the pixel data of a current frame F2 and reads the pixel data of the previous frame F1 from the memory unit 110. Then the display accelerating unit 120 locates an overdrive value $S_{OD}$ of the display pixels in a LUT disposed therein for accelerating the display of the image.

For example, if the pixel data of the previous frame F1 is to rotate the liquid crystal molecules of a particular pixel 30°, but the pixel data of the current frame F2 is to rotate the liquid crystal molecules of the pixel 150°, then the display accelerating unit 120 outputs the overdrive value $S_{OD}$ through table lookup after it receives the pixel data of the current frame F2 and the pixel data of the previous frame F1. With the overdrive value $S_{OD}$ output by the display accelerating unit 120, a larger voltage is supplied on the liquid crystal molecules so that the liquid crystal molecules can be transited and rotated to 150° more quickly in the interval between two images, and accordingly the response time is increased.

However, along with the increment in the resolution of LCD, the quantity of display data in the pixel data of the previous frame F1 stored in the memory unit 110 is also increased considerably, and accordingly the cost of the memory is greatly increased. Thereby, the display data in the pixel data of the previous frame F1 should be compressed to reduce the quantity thereof before it is stored and decompressed while it is used, so that the requirement to the memory volume can be reduced.

SUMMARY OF THE INVENTION

Accordingly, the present invention is directed to a display driving apparatus, wherein the display data of a previous frame is compressed in order to save memory space, and errors caused by data compression or decompression are avoided.

The present invention is directed to a display driving method, wherein the display data of a previous frame is compressed with a fixed compression ratio in order to save memory space, and errors caused by data compression are avoided.

The present invention provides a display driving apparatus including a memory unit, a compression and decompression unit, a data selection unit, and a display accelerating unit. The memory unit stores a previous compressed frame. The compression and decompression unit receives a current frame and compresses the current frame to obtain a current compressed frame, and the compression and decompression unit decompresses the current compressed frame to obtain a current decompressed frame, and the compression and decompression unit reads the previous compressed frame and decompresses the previous compressed frame to obtain a previous decompressed frame. The data selection unit determines a frame state according to the current decompressed frame and the previous decompressed frame and determines a compression error according to the current frame and the current decompressed frame. When the compression error is smaller than a predetermined value and the frame is determined to be dynamic, the previous decompressed frame is output as a first frame; otherwise, the current frame is output as the first frame. The data selection unit further selects and outputs one of the current frame and the current decompressed frame as a second frame. The display accelerating unit determines an overdriving process to the pixels according to the first frame and the second frame.

According to an embodiment of the present invention, the data selection unit includes a compression error determination circuit, an image determination circuit, and a data switching unit. The compression error determination circuit compares the current frame and the current decompressed frame in order to determine whether the current decompressed frame is distorted and outputs an error determination result. The image determination circuit compares the previous decompressed frame and the current decompressed frame to determine whether the frame is dynamic and outputs a frame state information. The data switching unit selects one of the previous decompressed frame and the current frame as the first frame according to the error determination result and the frame state information, and selects and outputs one of the current frame and the current decompressed frame as the second frame.

According to an embodiment of the present invention, the compression error determination circuit includes a first subtractor and a first comparison circuit. The first subtractor calculates a first difference between the current frame and the current decompressed frame. The first comparison circuit compares the first difference and the predetermined value to output the error determination result.

According to an embodiment of the present invention, the image determination circuit includes a second subtractor and a second comparison circuit. The second subtractor calculates a second difference between the previous decompressed frame and the current decompressed frame. The second comparison circuit compares the second difference and a dynamic predetermined value to output the frame state information.

According to an embodiment of the present invention, the data switching unit includes an AND gate, a first multiplexer, and a second multiplexer. The AND gate receives the error determination result and the frame state information and outputs a selection signal. The first multiplexer selects and outputs one of the previous decompressed frame and the current frame as the first frame according to the selection signal. The second multiplexer outputs selects and outputs one of the current frame and the current decompressed frame as the second frame according to the selection signal.

According to an embodiment of the present invention, the compression and decompression unit includes a compression circuit, a decompression circuit, and a buffer. The compression circuit compresses the current frame to obtain the current compressed frame and outputs the current compressed frame to the memory unit. The decompression circuit decompresses the previous compressed frame stored in the memory unit into the previous decompressed frame and decompresses the current compressed frame into the current decompressed frame. The buffer receives and temporarily stores the current frame.

According to an embodiment of the present invention, the memory unit includes a memory module and a memory management unit. The memory module stores the previous compressed frame and the current compressed frame. The memory management unit is coupled to the memory module for controlling the input and output of the memory module.

According to an embodiment of the present invention, the display accelerating unit includes a lookup table (LUT). The LUT locates an overdrive value of the display pixels according to the first frame and the second frame.

The present invention further provides a display driving method. First, a current frame is received, and a previous compressed frame is read from a memory unit, and the current frame is compressed to obtain a current compressed frame, the current compressed frame is decompressed to obtain a current decompressed frame, and the previous compressed frame is decompressed to obtain a previous decompressed frame. Then, a frame state is determined according to the current decompressed frame and the previous decompressed frame, and a compression error is determined according to the current frame and the current decompressed frame. When the compression error is smaller than a predetermined value and the frame is determined to be dynamic, the previous decompressed frame is selected as a first frame; otherwise, the current frame is selected as the first frame. After that, one of the current frame and the current decompressed frame is selected as a second frame. Finally, an overdriving process to the pixels is determined according to the first frame and the second frame.

According to an embodiment of the present invention, the current frame includes M×N pixel data, and the step of compressing the current frame to obtain the current compressed frame further includes following steps. A general average of the M×N pixel data is calculated. Whether each of the M×N pixel data is greater than the general average is sequentially determined, and the determination results are recorded as M×N marks. An upper half average is obtained according to the pixel data greater than the general average. A lower half average is obtained according to the pixel data smaller than the general average. The M×N marks, the upper half average, and the lower half average belong to the current compressed frame.

According to an embodiment of the present invention, the step of decompressing the current compressed frame to obtain the current decompressed frame further includes following steps. Whether each pixel data in the current frame is greater than the general average is determined according to the M×N marks. When it is determined that a $(i \times j)^{th}$ pixel data in the current frame is greater than the general average, the upper half average is used as a $(i \times j)^{th}$ decompressed pixel data in the current decompressed frame; otherwise, the lower half average is used as the $(i \times j)^{th}$ decompressed pixel data in the current decompressed frame.

According to the present invention, the display data of a previous frame is compressed in order to save memory space, and when it is detected that the decompressed display data is distorted, an overdriving mechanism is turned off in order to prevent any error caused by the data compression.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
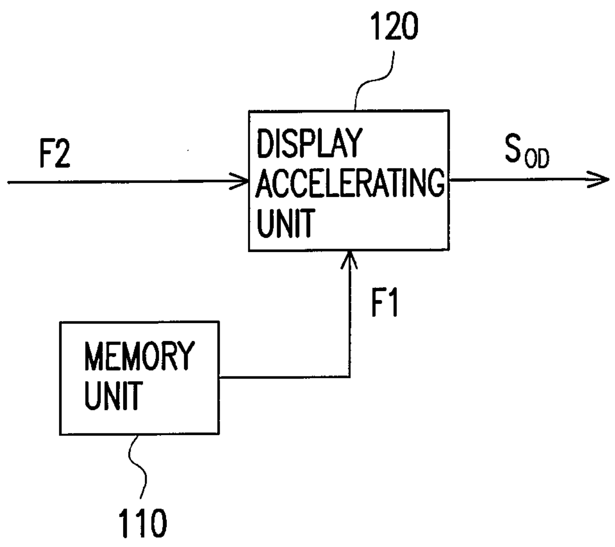
FIG. 1 (PRIOR ART)
FIG. 1 is a circuit block diagram of a conventional overdriving apparatus.

Reference will now be made in detail to the present preferred embodiments of the invention, examples of which are illustrated in the accompanying drawings. Wherever possible, the same reference numbers are used in the drawings and the description to refer to the same or like parts.

The present invention provides a display driving apparatus suitable for a display apparatus, wherein the display driving apparatus offers a compression method for reducing memory space and a corresponding data selection design. The compression method includes fixed image compression-decompression programs and may have fixed compression ratio and simple hardware structure. Meanwhile, the characteristic of the compression method in time domain increases the flexibility in subsequent data selection design so that a display accelerating unit in the display driving apparatus can process static and dynamic images and distorted compressed data more accurately. The present invention provides a new display accelerating unit and the peripheral circuits thereof in a display control integrated circuit (IC), which is suitable for a liquid crystal display (LCD) and will be described as so.

The display driving apparatus includes a display accelerating unit and the peripheral circuits thereof, which perform a lookup table (LUT) mapping between the pixel data of a current frame and the pixel data of a previous frame to obtain a new pixel data. Compared to the original pixel data, the new pixel data can reflect to the difference between two original frames so that the response speed of the liquid crystal molecules is reduced and the blurs at the edges of a moving object in a displayed image are also reduced accordingly.

The present invention provides a display driving apparatus suitable for a display apparatus. The display driving apparatus includes a compression and decompression unit, a memory management unit, a memory module, a data selection unit and a display accelerating unit. Besides data compression and decompression, the display driving apparatus in the present invention also provides a data selection function between the display accelerating unit and the compression and decompression unit for securing the compression ratio, simplifying the hardware structure, reducing the cost, and improving the display quality.

The compression and decompression unit buffers and compresses a current frame, and on the other hand, buffers and decompresses a previous frame or the current frame. Besides, the compression and decompression unit inputs a frame into the memory management unit or reads a frame from the memory management unit. Moreover, the compression and decompression unit outputs data to the data selection unit.

The memory management unit coordinates the data flow at various input and output interfaces of the memory module, so as to maintain the operation of the memory module. The memory module stores data, basically, the compressed data of a previous image. The data selection unit selects a suitable current frame and previous frame to be processed by the display accelerating unit according to the compression distortion condition and static/dynamic condition, so as to achieve ideal display images. The display accelerating unit compares the pixel data of the current frame and the previous frame through, for example, LUT mapping, to obtain a new pixel data. The new pixel data can reflect to the variation between the two original frames in consideration so that the response speed of the LCD panel is reduced and the blurs at the edges of a moving object in the displayed image are reduced.

According to an embodiment of the present invention, the data compression and decompression method adopts a block likelihood time-domain process, wherein a set of parameters are encoded in a unit of a particular pixel block based on an average representing rule. The parameters includes a mark bitmap, an upper half average, and a lower half average. These three parts represent a compressed data such that a fixed compression ratio can be obtained, and a simple decoding method can be obtained according to the encoding method, wherein in the decoding method, the upper half average and the lower half average are filled back into the mark bitmap. Foregoing method is not limited to any particular block division and corresponding method for generating the mark bitmap and the averages. However, the compression ratio and the hardware size vary along with different compression methods. In the compression and decompression unit and the data selection design corresponding to the block likelihood time-domain compression method in the present invention, the data selection path can be changed and expanded along with the block likelihood division method.

Below, a display driving apparatus having a display accelerating compression method and the corresponding data selection design thereof will be described in detail with reference to an embodiment of the present invention.

Figure 2:
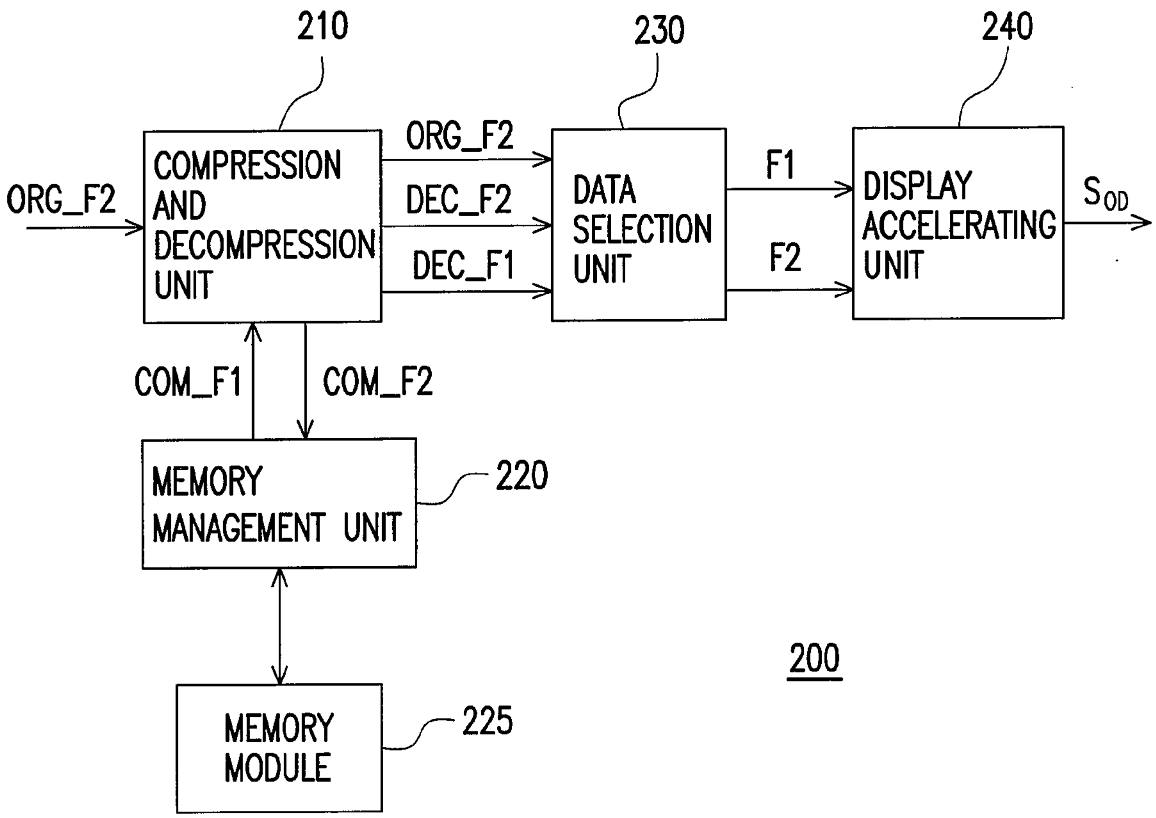
FIG. 2 is a circuit block diagram of a display driving apparatus according to an embodiment of the present invention.

FIG. 2 is a circuit block diagram of a display driving apparatus according to an embodiment of the present invention. Referring to FIG. 2, the display driving apparatus 200 includes a compression and decompression unit 210, a memory management unit 220, a memory module 225, a data selection unit 230, and a display accelerating unit 240. The compression and decompression unit 210 receives a current frame ORG_F2 from a front-end circuit (not shown), and the memory management unit 220 stores a previous compressed frame COM_F1, wherein the previous compressed frame COM_F1 may be a previous frame compressed by the compression and decompression unit 210.

Figures 3, 4:
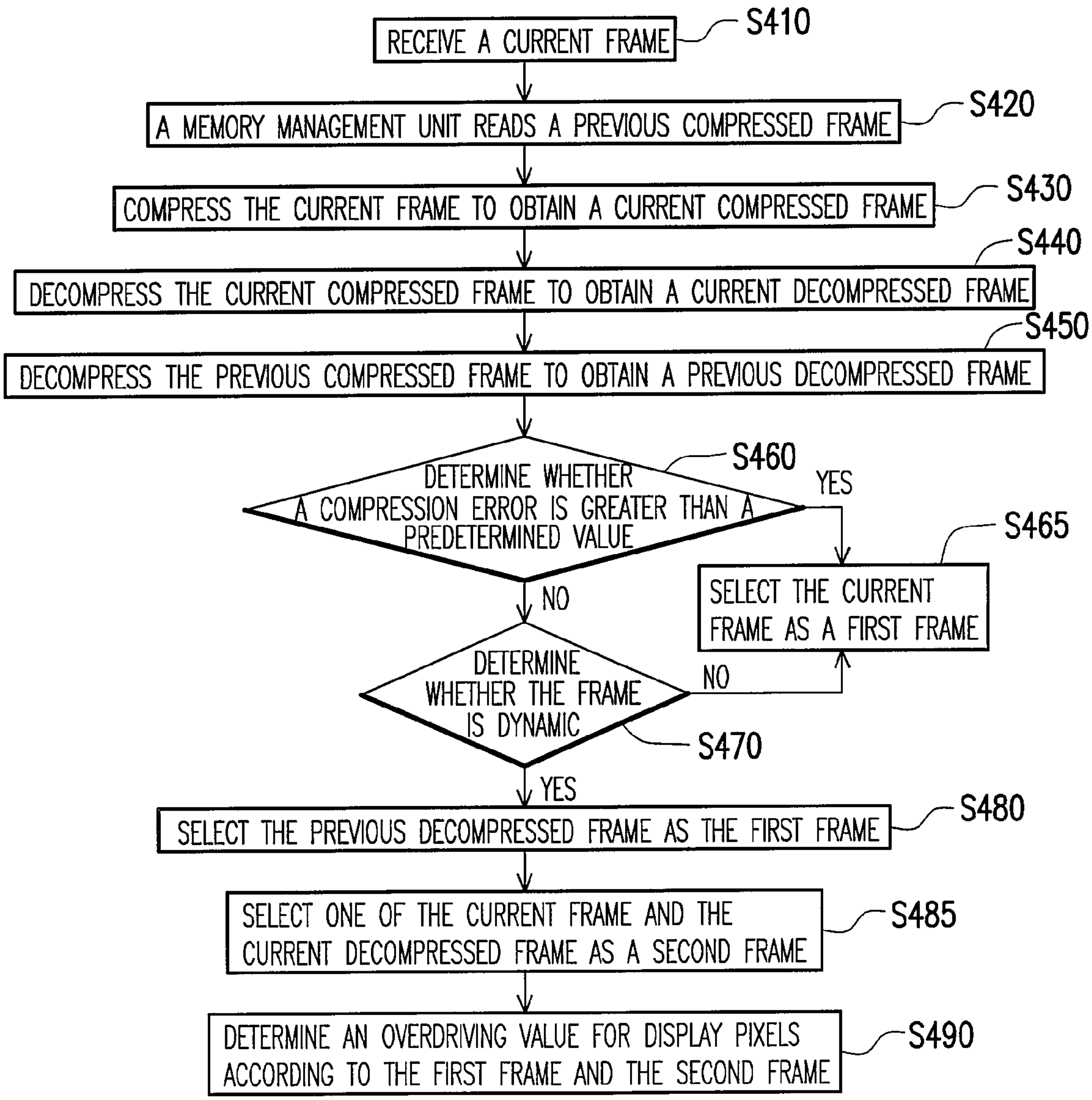
FIG. 3 illustrates a current frame according to an embodiment of the present invention.
FIG. 4 is a flowchart of a display driving method according to an embodiment of the present invention.

For the convenience of description, the display driving apparatus is assumed to be applied to a LCD. In the present embodiment, a frame may have M×N pixel data, and to simplify the description, 4×2 pixel data in a frame are used as example. However, the size of each frame is not limited in the present embodiment, and each pixel data may be the gray scale value of a pixel. For example, the current frame ORG_F2 may be the example shown in FIG. 3. Referring to FIG. 3, the current frame ORG_F2 includes 4×2 pixel data, and each pixel data may be the gray scale value of a pixel, as denoted by 101, 98, 99, 46, 102, 50, 48, and 48 in FIG. 3.

Referring to FIG. 2 again, while the compression and decompression unit 210 receives the current frame ORG_F2 and reads the previous compressed frame COM_F1, the compression and decompression unit 210 compresses the current frame ORG_F2 to obtain a current compressed frame COM_F2 and stores the current compressed frame COM_F2 into the memory module 225 through the memory management unit 220.

Next, the compression and decompression unit 210 decompresses the current compressed frame COM_F2 to obtain a current decompressed frame DEC_F2, namely, the compression and decompression unit 210 compresses the current frame ORG_F2 and then decompresses it, and then the compression and decompression unit 210 outputs the current decompressed frame DEC_F2 to the data selection unit 230. In addition, the compression and decompression unit 210 decompresses the previous compressed frame COM_F1 to obtain a previous decompressed frame DEC_F1 and outputs the previous decompressed frame DEC_F1 to the data selection unit 230.

As shown in FIG. 2, the data selection unit 230 receives the current frame ORG_F2, the current decompressed frame DEC_F2, and the previous decompressed frame DEC_F1.

The data selection unit 230 compares the current decompressed frame DEC_F2 and the previous decompressed frame DEC_F1 to determine whether the frame is dynamic, and the data selection unit 230 determines whether the error caused by frame compression and decompression is too large according to the current frame ORG_F2 and the current decompressed frame DEC_F2.

When it is determined that the compression error is smaller than a predetermined value and the frame is dynamic, the data selection unit 230 selects the previous decompressed frame DEC_F1 as a first frame F1 and outputs the first frame F1 to the display accelerating unit 240; otherwise, the data selection unit 230 selects the current frame ORG_F2 as the first frame F1 and outputs the first frame F1 to the display accelerating unit 240.

In other words, when it is determined that the compression error is smaller than the predetermined value but the frame is static, the data selection unit 230 outputs the current frame ORG_F2 to the display accelerating unit 240 as the first frame F1. When it is determined that the compression error is greater than the predetermined value, the data selection unit 230 also outputs the current frame ORG_F2 to the display accelerating unit 240 as the first frame F1 regardless of whether the frame is static or dynamic. Additionally, the data selection unit 230 further selects one of the current frame ORG_F2 and the current decompressed frame DEC_F2 as a second frame F2 (generally speaking, the current frame ORG_F2 is more frequently used as the second frame F2, but the current decompressed frame DEC_F2 may also be used as the second frame F2 according to the characteristic of the image) and outputs the second frame F2 to the display accelerating unit 240. The display accelerating unit 240 generates an overdrive value of the pixels according to the first frame F1 and the second frame F2.

In the present embodiment, the display accelerating unit 240 may be a liquid crystal accelerating unit (for example, an overdriving device) in a general LCD, namely, the display accelerating unit 240 outputs an overdrive value $S_{OD}$ for the display pixels by using a previous display data, a current display data and a LUT. Thus, in an actual implementation, the first frame F1 received by the display accelerating unit 240 is, for example, the previous display data, and the second frame F2 is, for example, the current display data.

As described in foregoing embodiment, when the data selection unit 230 determines that the error caused by compression and decompression is too large, the data selection unit 230 selects the current frame ORG_F2 as the first frame F1, and the second frame F2 may be one of the current frame ORG_F2 and the current decompressed frame DEC_F2. Namely, the display accelerating unit 240 can only receive the display data of the current frame, and accordingly, the display accelerating unit 240 turns off the overdriving mechanism so that while displaying the image, incorrect overdrive operation caused by the large compression and decompression error can be shielded off.

Additionally, as described in foregoing embodiment, when the data selection unit 230 determines that the frame is static, the data selection unit 230 selects the current frame ORG_F2 as the first frame F1 so that the display accelerating unit 240 turns off the overdriving mechanism. In other words, when the image is static, since the images corresponding to two adjacent frames are the same, the liquid crystal molecules do not need to rotate a large angle to present different images, and accordingly, the overdriving mechanism can be turned off.

FIG. 4 is a flowchart of a display driving method according to an embodiment of the present invention. Referring to FIG. 4, first, the compression and decompression unit receives a current frame ORG_F2 in step S410. Next, the memory management unit reads a previous compressed frame COM_F1 in step S420. After that, the compression and decompression unit compresses the current frame ORG_F2 to obtain a current compressed frame COM_F2 and stores through the memory management unit in step S430. Thereafter, the compression and decompression unit decompresses the current compressed frame COM_F2 to obtain a current decompressed frame DEC_F2 in step S440 and decompresses the previous compressed frame COM_F1 to obtain a previous decompressed frame DEC_F1 in step S450.

Next, in step S460, whether the error caused by the compression and decompression is greater than a predetermined value is determined according to the current frame ORG_F2 and the current decompressed frame DEC_F2 through a data selection mechanism. If it is determined that the compression error is greater than the predetermined value, the current frame ORG_F2 is output to the display accelerating unit as a first frame F1 in step S465; otherwise, if it is determined that the compression error is smaller than the predetermined value, then whether the frame is dynamic is further determined according to the current decompressed frame DEC_F2 and the previous decompressed frame DEC_F1 in step S470. If it is determined that the frame is static, the current frame ORG_F2 is output to the display accelerating unit as the first frame F1 in step S465; otherwise, if it is determined that the frame is dynamic, the previous decompressed frame DEC_F1 is output to the display accelerating unit 240 as the first frame F1 in step S480.

Thereafter, according to the data selection mechanism, in step S485, one of the current frame ORG_F2 and the current decompressed frame DEC_F2 is selected as a second frame F2, and the second frame F2 is output to the display accelerating unit. Finally, in step S490, the display accelerating unit calculates an overdrive value for the display pixels by using the first frame F1 and the second frame F2, namely, the display accelerating unit determines whether to turn off the overdriving mechanism or determine the overdrive value $S_{OD}$.

In the display driving method provided by the present invention, many existing video compression techniques can be used for compressing and decompressing the frames, and these techniques can all be applied to the embodiments described above. Below, a compression method adaptable to the present invention will be described.

How to compress and decompress the frames in steps S430~S450 will be described herein. However, following is only an embodiment of the compression and decompression process but not for limiting the compression method used in the present invention.

Figure 5:
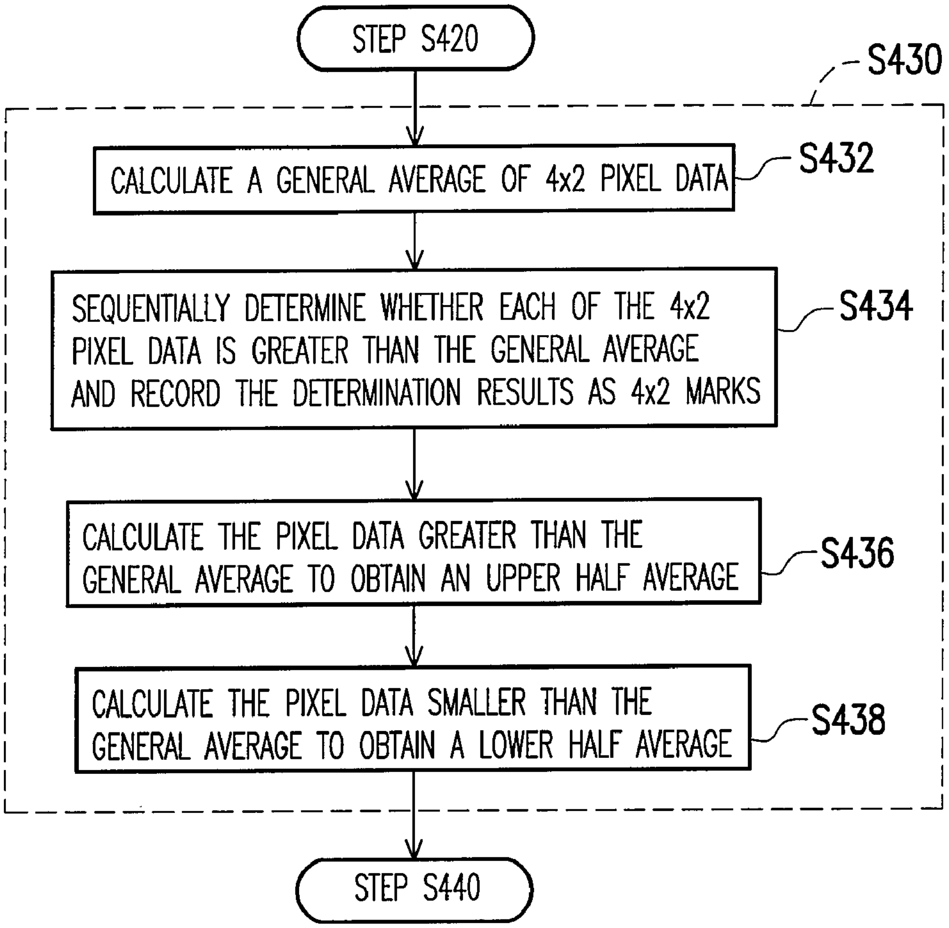
FIG. 5 is a flowchart of various sub-steps in step S430 according to an embodiment of the present invention.
Figure 6:
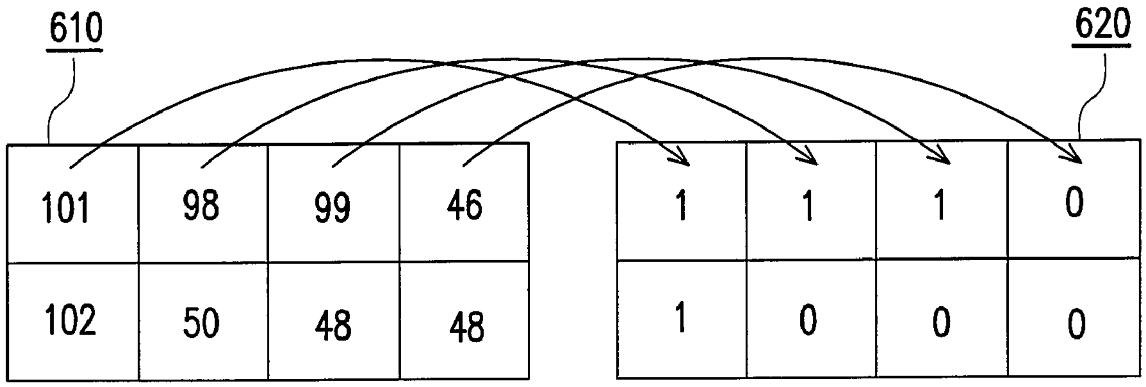
FIG. 6 illustrates the marks corresponding to a current frame.

First, how to compress the current frame ORG_F2 in step S430 will be explained with reference to both FIG. 5 and FIG. 6. FIG. 5 is a flowchart of various sub-steps in step S430 in the present embodiment, and FIG. 6 depicts a 4×2 pixel data for illustration. First, a general average of the 4×2 pixel data 610 is calculated in step S432, namely, an average of the eight pixel data in the current frame ORG_F2 is calculated, and taking the pixel data 610 as example, the general average of the current frame ORG_F2 is 74.

Thereafter, in step S434, whether each of the 4×2 pixel data is greater than the general average is determined, and the determination results are recorded as 4×2 marks, as the current frame 610 and the corresponding marks 620 in FIG. 6. Taking the pixel data at the first row and the first column of the current frame 610 as example, the value thereof is 101 and which is greater than the general average, thus, the value at the first row and the first column in the marks 620 is recorded as 1. Taking the pixel data at the second row and the second column of the current frame 610 as example, the value thereof is 50 and which is smaller than the general average, thus, the value at the second row and the second column in the marks 620 is recorded as 0.

Referring to FIG. 5 again, next, in step S436, those pixel data greater than the general average is calculated to obtain an upper half average. Taking the current frame 610 in FIG. 6 as example, the first three pixel data 101, 98, and 99 in the first row and the first pixel data 102 in the second row are greater than the general average, thus, the four pixel data are added and then the sum is divided by 4 to obtain the upper half average as 100. Accordingly, in this step, an average of all the pixel data greater than the general average is calculated.

After that, similarly, in step S438, those pixel data smaller than the general average is calculated to obtain a lower half average. Taking the current frame 610 in FIG. 6 as example, the fourth pixel data 46 in the first row and the pixel data 50, 48, and 48 in the second row are all smaller than the general average, therefore the four pixel data are added and the sum is then divided by 4 to obtain the lower half average as 48.

Three data are obtained from foregoing steps S434, S436, and S438, which are respectively 4×2 marks, the upper half average, and the lower half average. In the present embodiment, the three data may be the current compressed frame COM_F2, namely, the compression method described above has a fixed compression ratio 3/8. In addition, the three data is stored by the memory management unit as the overdriving process data of the next frame.

Figure 7:
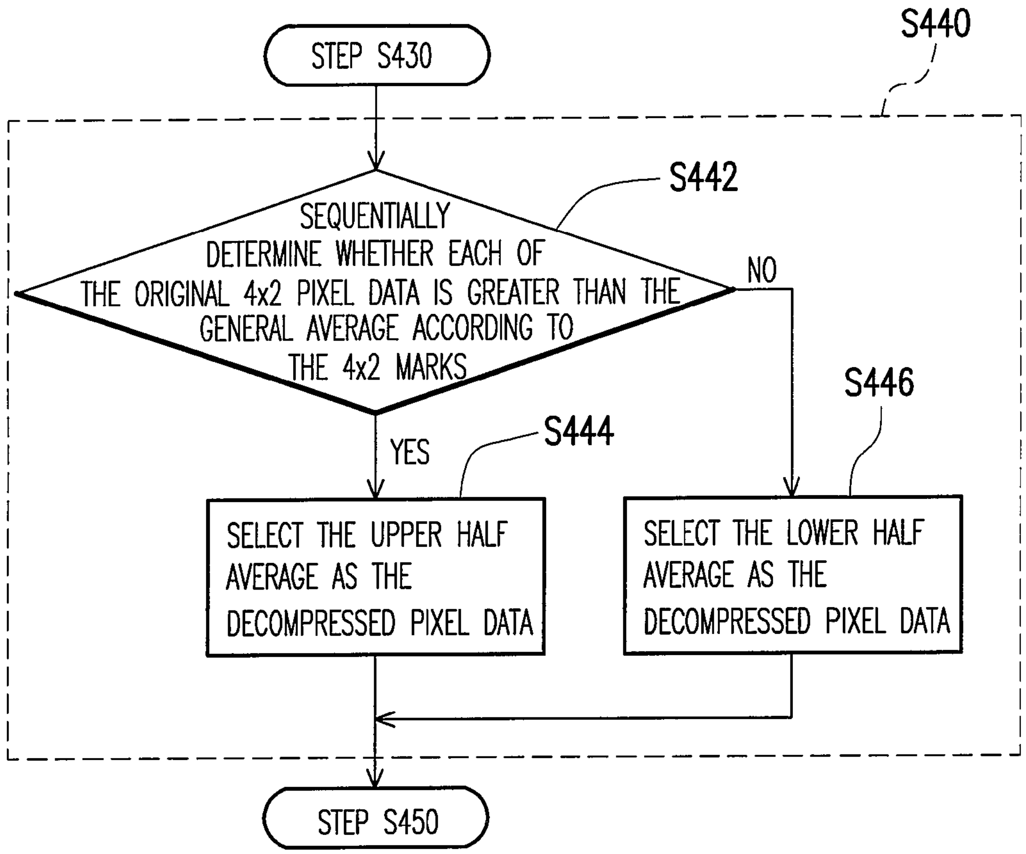
FIG. 7 is a flowchart of various sub-steps in step S440 according to an embodiment of the present invention.
Figure 8:
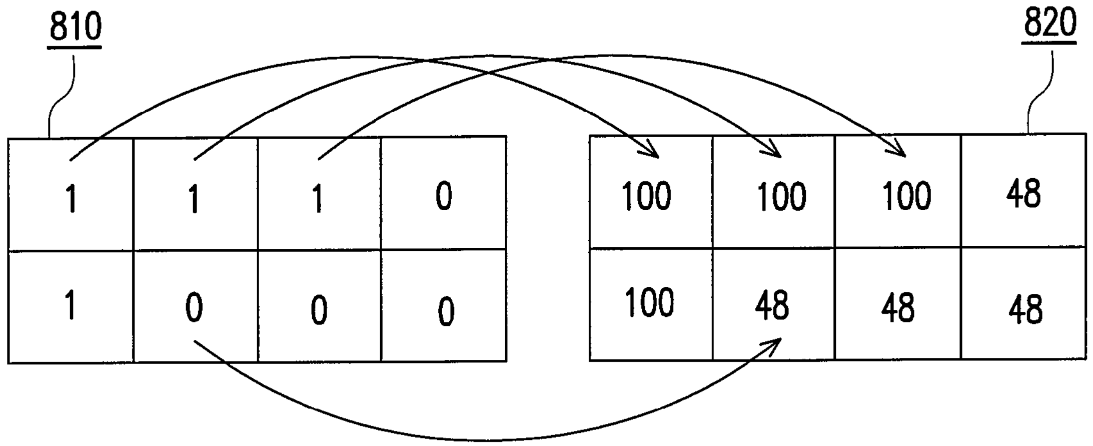
FIG. 8 illustrates a current decompressed frame according to an embodiment of the present invention.

Next, how to decompress the current compressed frame COM_F2 to obtain the current decompressed frame DEC_F2 in step S440 will be described with reference to both FIG. 7 and FIG. 8. FIG. 7 is a flowchart of various sub-steps in step S440 in the present embodiment, and FIG. 8 illustrates the mapping between the marks 810 and the decompressed frame 820. First, taking the 4×2 marks 810 as example, whether each of the original 4×2 pixel data is greater than the general average is sequentially determined in step S442.

For example, the value in the first row and the first column in the marks 810 is 1, which means the original pixel data in the first row and the first column of the current frame ORG_F2 is greater than the general average, thus, the upper half average (i.e. 100) is used as the pixel data in the first row and the first column in the current decompressed frame DEC_F2. Taking the mark in the second row and the second column of the marks 810 as example, the value thereof is 0, which means the original pixel data in the second row and the second column of the current frame ORG_F2 is smaller than the general average, thus, the lower half average (i.e. 48) is used as the decompressed pixel data in the second row and the second column of the current decompressed frame DEC_F2. Accordingly, in the present embodiment, the current decompressed frame DEC_F2 may be as the decompressed frame 820 illustrated in FIG. 8.

Referring to FIG. 8, the pixel data in the decompressed frame 820 at the corresponding positions which have value 1 in the marks 810 are all 100 (i.e. the upper half average), and the pixel data in the decompressed frame 820 at the corresponding positions which have value 0 in the marks 810 are all 48 (i.e. the lower half average). In other words, in step S444, the upper half average is used as the decompressed pixel data corresponding to those pixel data which is determined to be greater than the general average in step S442, and in step S446, the lower half average is used as the decompressed pixel data corresponding to those pixel data which is determined to be smaller than the general average in step S442.

In step S450, the method for decompressing the previous compressed frame COM_F1 to obtain the previous decompressed frame DEC_F1 is the same as that used in step S440, therefore will not be described herein.

It should be mentioned that in foregoing method for compressing and decompressing a frame, the pixel data in the frame is divided into two different types (those greater than the general average and those smaller or equal to the general average), and a mark showing whether each pixel data is greater than the general average is recorded. While decompressing the frame, these marks are used for restoring the original pixel data. However, it should be understood by those having ordinary knowledge in the art that to reduce the error caused by compression and decompression, in foregoing method for compressing and decompressing a frame, the pixel data in the frame may also be divided into four or more different types according to the values thereof, and then marks having multiple bits may be used for recording the type of each pixel data. These marks may also be used for restoring the original pixel data when decompressing the frame.

In addition, even though a frame having 4×2 pixel data is used as an example in the embodiment described above, the images displayed by existing LCDs usually have the size of 1024×768 or 800×600 etc. Thus, it should be understood by those having ordinary knowledge in the art that while implementing the present invention, an entire image may be directly considered as one frame or may also be divided into a plurality of frames having 4×2 pixel data to be processed respectively.

Below, a display driving apparatus provided by the present invention will be described with reference to another embodiment of the present invention.

Figure 9:
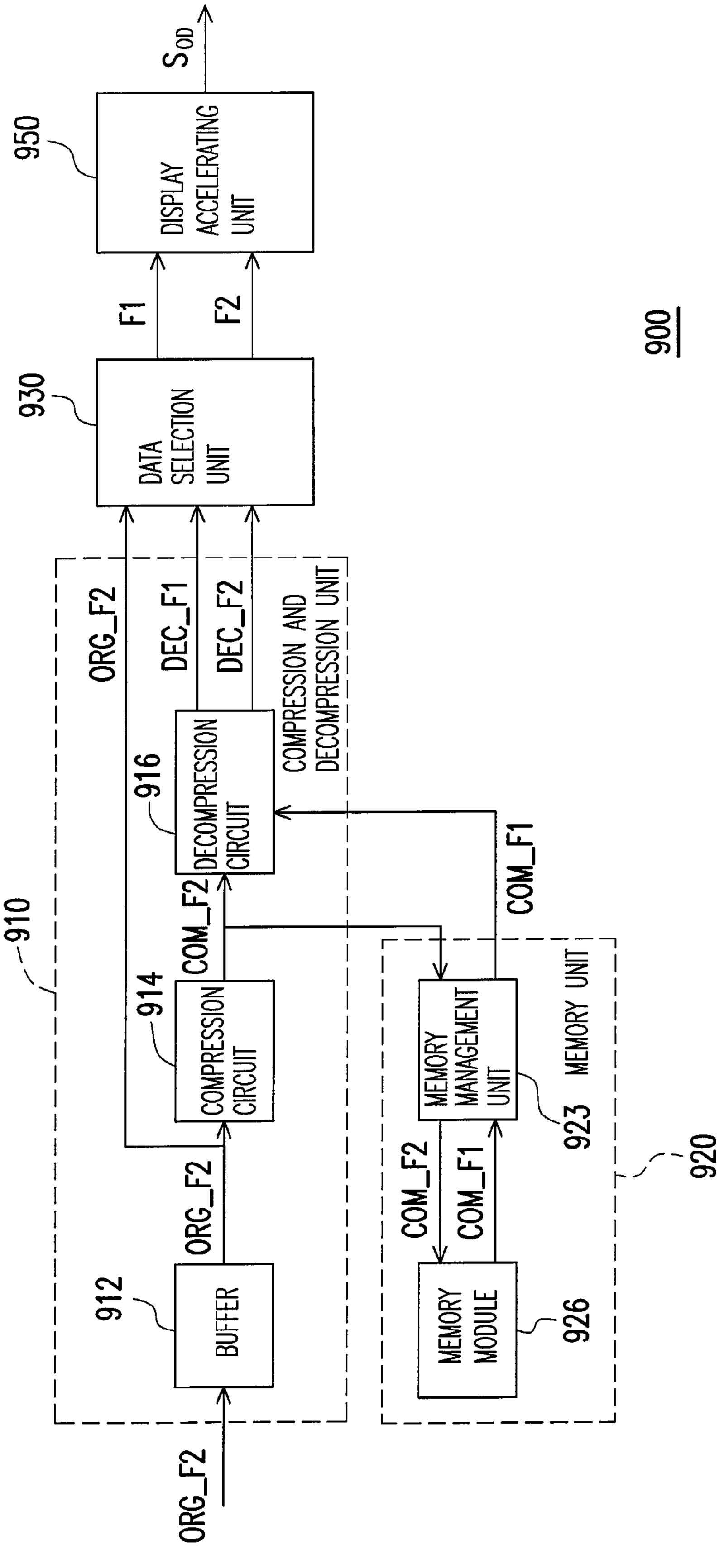
FIG. 9 is a circuit block diagram of a display driving apparatus according to an embodiment of the present invention.

FIG. 9 is a circuit block diagram of a display driving apparatus according to an embodiment of the present invention. Referring to FIG. 9, the display driving apparatus 900 includes a compression and decompression unit 910, a memory unit 920, a data selection unit 930, and a display accelerating unit 950.

The decompression circuit 910 includes a buffer 912, a compression circuit 914, and a decompression circuit 916 which are connected to each other in series. The memory unit 920 includes a memory management unit 923 and a memory module 926. The memory module 926 stores a compressed frame, and the memory management unit 923 performs memory management so as to control the data input into and output from the memory module 926. The internal circuit of the data selection unit 930 will be described in detail below.

For the convenience of description, it will be assumed that the display driving apparatus is applied to a conventional LCD, and the frames in the present embodiment all have 4×2 pixel data, wherein each pixel data may be the gray scale value of a pixel. However, foregoing assumptions are not intended to restricting the scope of the present invention. The operation of the display driving apparatus will be described herein.

First, the buffer 912 receives a current frame ORG_F2 from a prior circuit, and outputs the current frame ORG_F2 to the compression circuit 914 and the data selection unit 930 after a delay period. When the compression circuit 914 receives the current frame ORG_F2, the compression circuit 914 compresses the current frame ORG_F2 to obtain a current compressed frame COM_F2 and outputs the current compressed frame COM_F2 to the decompression circuit 916 and the memory management unit 923. The memory management unit 923 stores the current compressed frame COM_F2 received from the compression circuit 914 into the memory module 926, and the memory management unit 923 reads a previous compressed frame COM_F1 from the memory module 926 and outputs the previous compressed frame COM_F1 to the decompression circuit 916.

The decompression circuit 916 decompresses the current compressed frame COM_F2 to obtain a current decompressed frame DEC_F2 and outputs the current decompressed frame DEC_F2 to the data selection unit 930. In addition, the decompression circuit 916 decompresses the previous compressed frame COM_F1 into a previous decompressed frame DEC_F1 and outputs the previous decompressed frame DEC_F1 to the data selection unit 930.

Thereafter, the data selection unit 930 determines whether a compression error is caused to the frames and whether the frames are dynamic so as to select a first frame F1 and a second frame F2 from the current frame ORG_F2, the previous decompressed frame DEC_F1, and the current decompressed frame DEC_F2 and output the first frame F1 and the second frame F2 to the display accelerating unit 950. The display accelerating unit 950 determines an overdrive value for the display pixels according to the first frame F1 and the second frame F2. In the present embodiment, the operation of the display accelerating unit 950 is the same as that of the display accelerating unit 240 illustrated in FIG. 2, therefore will not be described herein. In addition, the compression and decompression methods adopted by the compression circuit 914 and the decompression circuit 916 may be the compression and decompression methods illustrated in FIG. 5 and FIG. 7 or other video compression techniques in the art.

Figure 10:
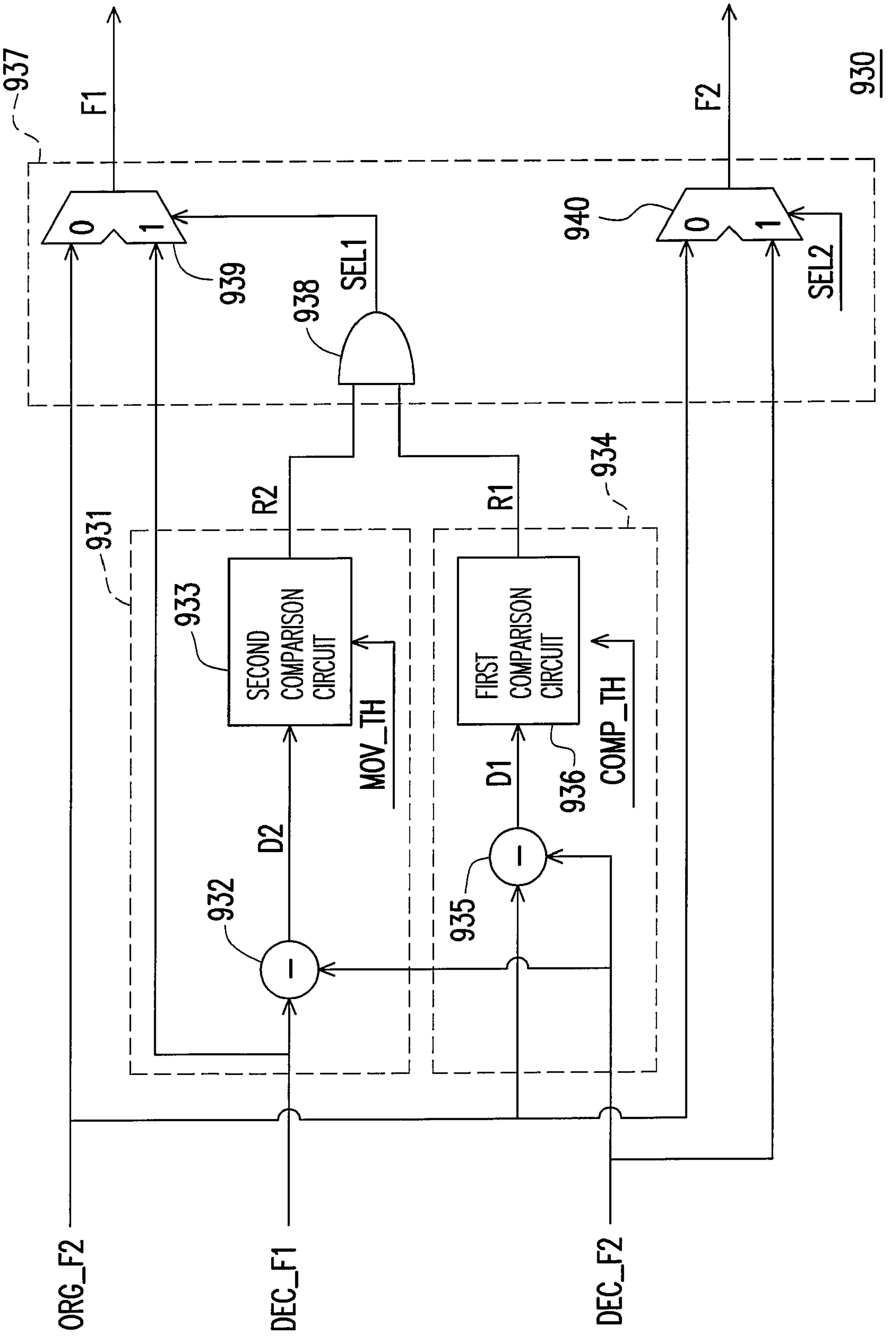
FIG. 10 is a circuit block diagram of a data selection unit according to an embodiment of the present invention.

An actual circuit of the data selection unit 930 will be described with reference to FIG. 10 so that those having ordinary knowledge in the art can implement the present invention easily. FIG. 10 is a circuit block diagram of a data selection unit according to an embodiment of the present invention. Referring to FIG. 10, the data selection unit 930 includes an image determination circuit 931, a compression error determination circuit 934, and a data switching unit 937. The compression error determination circuit 934 further includes a first subtractor 935 and a first comparison circuit 936. The image determination circuit 931 includes a second subtractor 932 and a second comparison circuit 933. The data switching unit 937 includes an AND gate 938, a first multiplexer 939, and a second multiplexer 940.

First, the subtractor 935 in the compression error determination circuit 934 subtracts the current frame ORG_F2 from the current decompressed frame DEC_F2 to output a first difference D1 to the first comparison circuit 936. The first comparison circuit 936 compares the first difference D1 and a predetermined value COMP_TH and output an error determination result R1 to an input terminal of the AND gate 938 in the data switching unit 937. For the convenience of description, here it is assumed that if the first difference D1 is greater than the predetermined value COMP_TH, the error determination result R1 output by the first comparison circuit 936 is logic 0 so that the data switching unit 937 is informed that a large error is caused by the compression and decompression; otherwise, when the first difference D1 is smaller than or equal to the predetermined value COMP_TH, the error determination result R1 output by the first comparison circuit 936 is logic 1 so that the data switching unit 937 is informed that the error caused by the compression and decompression is acceptable.

In addition, the subtractor 932 in the image determination circuit 931 subtracts the current decompressed frame DEC_F2 from the previous decompressed frame DEC_F1 to output a second difference D2 to the second comparison circuit 933. The second comparison circuit 933 compares the second difference D2 and a dynamic predetermined value MOV_TH to output the frame state information R2 to the ANG gate 938 in the data switching unit 937. For the convenience of description, here it is assumed that if the second difference D2 is greater than the dynamic predetermined value MOV_TH, the frame state information R2 output by the second comparison circuit 933 is logic 1, so that the data switching unit 937 is informed that the frame is dynamic; otherwise, when the second difference D2 is smaller than or equal to the dynamic predetermined value MOV_TH, the frame state information R2 output by the second comparison circuit 933 is logic 0, so that the data switching unit 937 is informed that the frame is static.

Next, the AND gate 938 in the data switching unit 937 outputs a selection signal SEL1 according to the error determination result R1 and the frame state information R2. Here if both the error determination result R1 and the frame state information R2 are logic 1, then the selection signal SEL1 output by the AND gate 938 is logic 1 so that the first multiplexer 939 selects the previous decompressed frame DEC_F1 as the first frame F1.

On the other hand, the second multiplexer 940 receives another selection signal SEL2 so as to select one of the current decompressed frame DEC_F2 and the current frame ORG_F2 as the second frame F2. However, generally speaking, the original data of an image should be directly processed in an image processing, thus, the selection signal SEL2 is preset to 0 so that the current frame ORG_F2 corresponding to the original data is output as the second frame F2 and accordingly the display accelerating unit (not shown) can determine a suitable overdrive value according to the original data (i.e. the current frame ORG_F2) directly. Certainly, the current decompressed frame DEC_F2 may also be selected as the second frame F2 according to the characteristic of the image, which is also within the scope of the present invention.

In other words, the second multiplexer 940 is an optional device. In the present embodiment, the second multiplexer 940 may also be skipped and the current frame ORG_F2 (or the current decompressed frame DEC_F2) can be directly output as the second frame F2 to the backend display accelerating unit, which is also within the scope of the present invention.

As described above, when the compression error of the frame is within an acceptable range and the frame is dynamic, then because the images displayed by a LCD change quickly, the first frame F1 and the second frame F2 input to the display accelerating unit 950 respectively represent the information of a previous frame and the information of a current frame so that the display accelerating unit 950 can perform an overdriving operation and the overdrive value $S_{OD}$ output by the display accelerating unit 950 can increase the rotation rate of the liquid crystal molecules. Accordingly, residual image caused while displaying dynamic images can be prevented.

Additionally, when the frame state information R2 is logic 0, then even though the compression error of the frame is within an acceptable range, since the frame is static, the rotation rate of the liquid crystal molecules needs not to be increased, and accordingly, the selection signal SEL1 output by the AND gate 938 is logic 0. In this case, the first multiplexer 939 selects the current frame ORG_F2 as the first frame F1 and the second multiplexer 940 also selects the current frame ORG_F2 as the second frame F2. Accordingly, the display accelerating unit 950 turns off the overdriving mechanism so that when the LCD is displaying a static image, the original image data will not be changed by the compression operation and the resolution of the displayed image can be increased.

On the other hand, it can be understood from the circuit of the data switching unit 937 that if the error determination result R1 is logic 0, the selection signal SEL1 output by the AND gate 938 is always 0 regardless of whether the frame state information R2 is logic 0 or logic 1. Namely, when the compression error exceeds the acceptable range, the data selection unit 930 selects the current frame ORG_F2 as the first frame F1 and the second frame F2 so that the display accelerating unit 950 turns off the overdriving mechanism. Accordingly, the data selection unit 930 can prevent image distortion caused by the compression and decompression process.

In the embodiment described above, the frame is assumed to have 4×2 pixel data, however, when the compression error determination circuit 934 determines the compression error, a determination region (for example, a frame having 5×3 pixel data) can be defined around the frame having 4×2 pixel data, and then whether the compression error is greater than the predetermined value is determined by using each pixel data in this determination region. Accordingly, boundary effect caused by different compression and decompression processes performed to two adjacent frames can be prevented.

In summary, in the present invention, whether a compression error caused by compression and decompression is within an acceptable range is determined by a data selection unit, and once it is determined that the compression error is greater than a predetermined value, a display accelerating unit turns off the overdriving mechanism so that image distortion caused by compression and decompression can be effectively prevented.

Moreover, when both static and dynamic images are displayed, according to embodiments of the present invention, whether a plurality of frames in an image is static or dynamic can be respectively determined by the data selection unit, and when a frame is determined to be static, the display accelerating unit turns off the overdriving mechanism so that the original pixel data of the frame is directly displayed and accordingly resolution drop caused by compression and decompression while displaying the static frame can be prevented.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display driving apparatus, comprising:

a memory unit, for storing a previous compressed frame;

a compression and decompression unit, for receiving a current frame and the previous compressed frame, compressing the current frame to obtain a current compressed frame, and decompressing the current compressed frame to obtain a current decompressed frame, and decompressing the previous compressed frame to obtain a previous decompressed frame;

a data selection unit, obtaining a frame state information according to the current decompressed frame and the previous decompressed frame, and determining a compression error according to the current frame and the current decompressed frame, wherein when the compression error is smaller than a predetermined value and the frame state information is dynamic, the data selection unit outputs the previous decompressed frame as a first frame, otherwise, when the compression error is greater than the predetermined value or the frame state information is static, the data selection unit outputs the current frame as the first frame; and a display accelerating unit, determining an overdrive value according to the first frame and a second frame.

2. The display driving apparatus according to claim 1, wherein the second frame is the current frame or the current decompressed frame.

3. The display driving apparatus according to claim 1, wherein the data selection unit comprises:

a compression error determination circuit, for calculating the compression error and outputting an error determination result according to the compression error;

an image determination circuit, for comparing the previous decompressed frame and the current decompressed frame to obtain the frame state information; and a data switching unit, for selecting one of the previous decompressed frame and the current frame as the first frame according to the error determination result and the frame state information.

4. The display driving apparatus according to claim 3, wherein the compression error determination circuit comprises:

a first subtractor, for calculating a first difference between the current frame and the current decompressed frame; and a first comparison circuit, for comparing the first difference and the predetermined value to output the error determination result.

5. The display driving apparatus according to claim 3, wherein the image determination circuit comprises:

a second subtractor, for calculating a second difference between the previous decompressed frame and the current decompressed frame; and a second comparison circuit, for comparing the second difference and a dynamic predetermined value to output the frame state information.

6. The display driving apparatus according to claim 3, wherein the data switching unit comprises:

an AND gate, for receiving the error determination result and the frame state information to output a selection signal; and a first multiplexer, for selecting one of the previous decompressed frame and the current frame as the first frame according to the selection signal and outputting the first frame.

7. The display driving apparatus according to claim 6, wherein the data switching unit further comprises:

a second multiplexer, for selecting one of the current frame and the current decompressed frame as the second frame and outputting the second frame.

8. The display driving apparatus according to claim 1, wherein the compression and decompression unit comprises:

a compression circuit, for compressing the current frame to obtain the current compressed frame, and outputting the current compressed frame to the memory unit; and a decompression circuit, for decompressing the previous compressed frame stored in the memory unit into the previous decompressed frame, and decompressing the current compressed frame into the current decompressed frame.

9. The display driving apparatus according to claim 8, wherein the compression and decompression unit further comprises:

a buffer, for temporarily storing the current frame and outputting the current frame to the compression circuit.

10. The display driving apparatus according to claim 8, wherein the memory unit comprises:

a memory module, for storing the previous compressed frame and the current compressed frame; and a memory management unit, coupled to the memory module, for controlling the input and output of the memory module.

11. The display driving apparatus according to claim 1, wherein the display accelerating unit comprises:

a lookup table (LUT), for locating the overdrive value according to the first frame and the second frame.

12. A display driving method, comprising:

receiving a current frame;

reading a previous compressed frame;

compressing the current frame to obtain a current compressed frame;

decompressing the current compressed frame to obtain a current decompressed frame;

decompressing the previous compressed frame to obtain a previous decompressed frame;

comparing the current decompressed frame and the previous decompressed frame to obtain a frame state information, and comparing the current frame and the current decompressed frame to obtain a compression error, wherein when the compression error is smaller than a predetermined value and the frame state information is determined to be dynamic, the previous decompressed frame is selected as a first frame, otherwise, when the compression error is greater than the predetermined value or the frame state information is static, the current frame is selected as the first frame; and determining an overdrive value according to the first frame and a second frame.

13. The display driving method according to claim 12 further comprising:

selecting one of the current frame and the current decompressed frame as the second frame.

14. The display driving method according to claim 12, wherein the current frame comprises M×N pixel data, and the step of compressing the current frame to obtain the current compressed frame comprises:

calculating a general average of the M×N pixel data;

sequentially determining whether each of the M×N pixel data is greater than the general average, and recording the determination results as M×N marks;

obtaining an upper half average according to the pixel data greater than the general average;

obtaining a lower half average according to the pixel data smaller than the general average; and wherein the M×N marks, the upper, half average, and the lower half average belong to the current compressed frame.

15. The display driving method according to claim 14, wherein the current decompressed frame comprises M×N decompressed pixel data, and the step of decompressing the current compressed frame to obtain the current decompressed frame comprises:

determining whether each pixel data in the current frame is greater than the general average according to the M×N marks; and selecting the upper half average as a $(i \times j)^{th}$ decompressed pixel data in the current decompressed frame when a $(i \times j)^{th}$ pixel data in the current frame is greater than the general average, otherwise selecting the lower half average as the $(i \times j)^{th}$ decompressed pixel data in the current decompressed frame.

* * * * *